W. N. ALLAN.
LIGHTING ATTACHMENT FOR AUTOMOBILES OR OTHER VEHICLES.
APPLICATION FILED JUNE 12, 1914.
1,175,672.
Patented Mar. 14, 1916
2 SHEETS—SHEET 1.
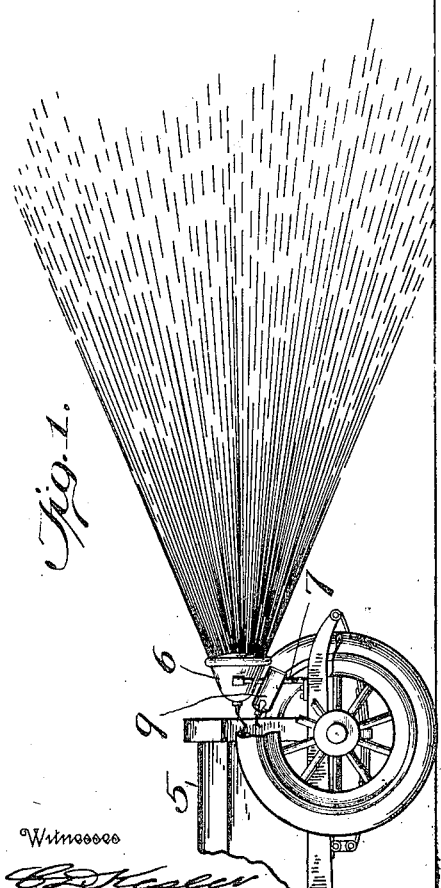
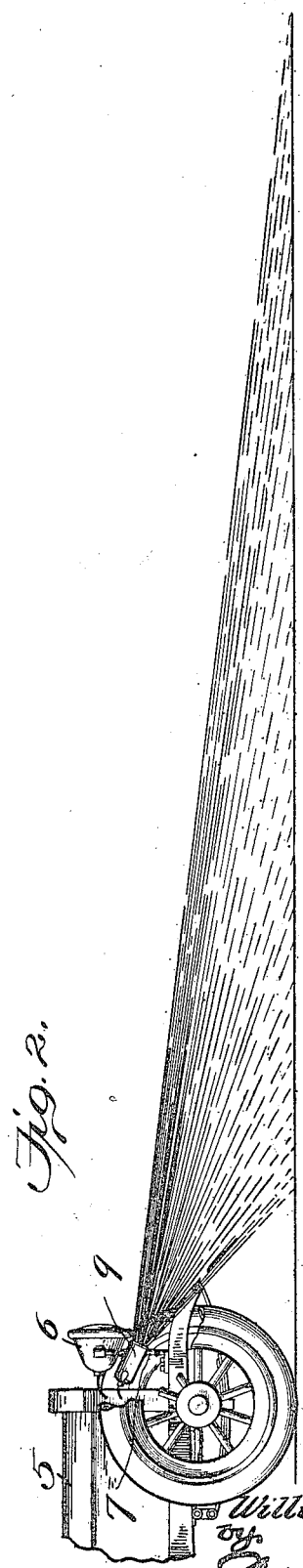

W. N. ALLAN.
LIGHTING ATTACHMENT FOR AUTOMOBILES OR OTHER VEHICLES.
APPLICATION FILED JUNE 12, 1914.
1,175,672.
Patented Mar. 14, 1916.
2 SHEETS—SHEET 2.
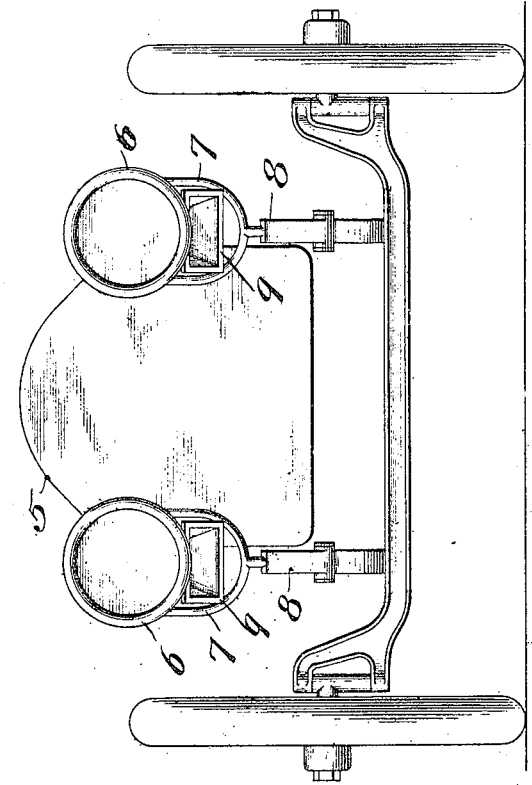
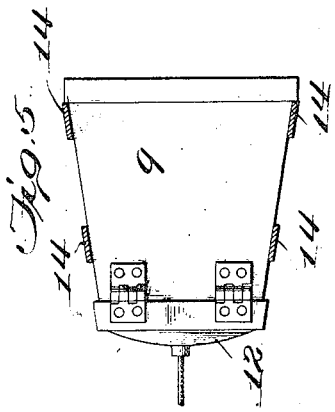
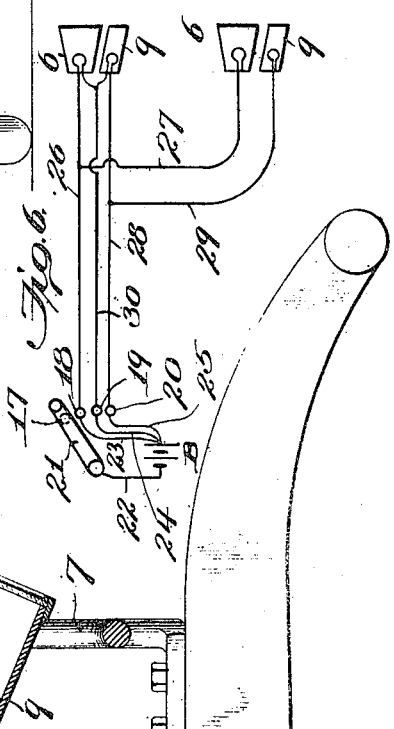
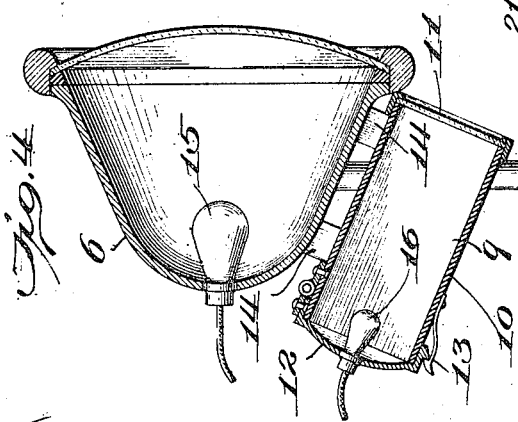
Witnesses
Inventor
William N. Allan
Attorney

UNITED STATES PATENT OFFICE.

WILLIAM N. ALLAN, OF BALTIMORE, MARYLAND.

LIGHTING ATTACHMENT FOR AUTOMOBILES OR OTHER VEHICLES.

1,175,672.

Specification of Letters Patent. Patented Mar. 14, 1916.

Application filed June 12, 1914. Serial No. 844,757.

*To all whom it may concern:*

Be it known that I, WILLIAM N. ALLAN, a citizen of the United States, residing at Baltimore, in the State of Maryland, have invented new and useful Improvements in Lighting Attachments for Automobiles or other Vehicles, of which the following is a specification.

This invention relates to a headlight or illuminating attachment for an automobile or other vehicle, and the primary object of the invention is to provide a dual light attachment at the front of an automobile or other vehicle consisting, at least, of a group of two adjacently located fixed lighting devices or lamps, the groups being preferably located at each side of the automobile or vehicle, one lighting device of each group being the usual form of headlight adapted to cast or project light rays straight away or longitudinally in front of the automobile or vehicle, and the other lighting device of the group being disposed to invariably cast or project light rays at a downward angle of inclination, the lighting devices of each group being operable to independently or conjointly cast or project rays of light in accordance with their fixed positions as occasion and circumstances may demand without requiring a chauffeur or driver to alight from the automobile or vehicle to modify the character of the illumination.

The invention consists of the preferred construction and arrangement of parts which will be more fully hereinafter described and claimed.

In the drawings: Figure 1 is a side elevation of the forward extremity of an automobile, partially broken away, and showing the improved lighting attachment applied thereto and the ordinary headlight as operating to project light rays forwardly or straight away therefrom, the downwardly inclined fixed lighting device of the attachment being in disuse. Fig. 2 is a view similar to Fig. 1 illustrating the downwardly inclined fixed light of the attachment in use and the headlight in disuse. Fig. 3 is a front end elevation of an automobile showing the improved lighting attachment thereon. Fig. 4 is a longitudinal vertical section through one of the lighting attachment groups and also illustrating a part of the chassis. Fig. 5 is a sectional plan view of the downwardly inclined fixed lighting device. Fig. 6 is a diagrammatic view particularly showing the electric circuits and switch whereby the groups of lights may be independently and conjointly operated.

The numeral 5 designates an automobile or other vehicle having the usual headlights 6 and supports or yokes 7, the said headlights and supports being held in fixed position at opposite sides of the front extremity of the automobile, as clearly shown. The supports or yokes 7 are held on opposite members of the chassis, as at 8, and the particular mode of securing the supports or yokes 7 or the particular type of supports or yokes is not essential so long as a space is provided therein below the headlights. The improved lighting attachment, however, or the lighting attachment as a whole may be used with various forms of supports or yokes, but in all instances it is preferred that the supports or yokes as well as the headlights remain in fixed position as in the ordinary application of automobile headlights.

Adjacent to each headlight 6 and below the latter is a fixed supplemental lighting device 9, comprising a suitable casing 10 having a front glass 11 and a rear hinged cap 12 provided with a suitable catch, as at 13. The lighting device 9, as shown, is held within each support or yoke 7 and disposed at a fixed downward angle of inclination, the front end of the lighting device 9 being preferably disposed close under and in rear of the front of the headlight 6. Moreover, each lighting device 9 is shown as disposed in the support or yoke 7 and is secured in fixed position by straps 14 attached thereto and to the opposite sides of the headlight or to any other suitable means that may be provided adjacent thereto.

The headlights 6 and the supplemental lighting devices 9 are shown as respectively provided with incandescent electric lights 15 and 16 which may be of any preferred type, or other lighting means might be used and operable for extinction and ignition from the interior of the automobile or other vehicle at the rear thereof. When the electric lamps are used in the headlights and supplemental lighting devices they will be wired up, as shown for instance by Fig. 6, to a switch embodying four points 17, 18, 19 and 20, with which a switch lever 21 is mounted to coöperate and close the circuits. The switch lever 21 is connected by a wire 22 with one pole of a battery B and the opposite pole of the battery is respectively connected by wires 23, 24 and 25 to the switch points or contacts 18, 19 and 20. The switch point 17 is a neutral, or when the switch lever 21 is in engagement therewith the headlights and supplemental lighting devices will be extinguished. The switch point or contact 18 has a suitable connection 26 with one of the headlights 6, a branch connection 27 running to the other headlight 6. The switch point or contact 20 has a suitable connection 28 with one of the supplemental lighting devices 9, and from the connection 28 a branch connection 29 is attached to the other supplemental lighting device. From the switch point or contact 19 a suitable connection 30 runs and is branched in relation to one group of lighting devices 6 and 9 and through the medium of the branch connections 27 and 29 the other groups are included in the united circuit.

The improved lighting attachment, as hereinbefore indicated, embodies two lighting devices or a headlight and a supplemental lighting means in each group, and through the electrical connections diagrammatically shown by Fig. 6, and illustrating one form of electrical control, the headlights and the supplemental lighting devices may be independently or conjointly operated, and when it is desired to change the light projected from the front of an automobile or other vehicle it will require a very simple operation to move the switch lever 21 so as to engage the switch point or contact 18 to cause the headlights 6 to become active; if the switch lever 21 is moved into engagement with the contact 20 the lights in the headlights 6 will be extinguished and the supplemental lighting devices 9 will become active; and if the switch lever 21 is brought to bear on the switch point or contact 19, both lighting devices of each group will be in operation or unitedly project rays of light in advance thereof in accordance with the position of said lighting devices.

From the foregoing it will be seen that the illumination at the front of an automobile or other vehicle may be readily controlled so as to change the same from a longitudinally projected light to a downwardly inclined light, or vice versa, as occasion may require and to comply particularly with the regulations of certain municipalities where it is required that disadvantageous glare of headlights casting the rays of light straight away from the front of the machine be changed to a downwardly inclined illumination or to so dispose the illumination as to obviate the forward glare which is so puzzling to pedestrians and others. The change of the angle of rays of light or the illumination at the front of the machine may be easily accomplished by the driver or chauffeur while sitting in the automobile or vehicle on which the lighting attachments are mounted, and it is proposed to have the lever 21 within easy reaching distance and readily operative to change the angle of light as may be required.

One of the most important advantages of the improved lighting attachment is that no changes in the standardized organization of the usual form of headlight supports are required to apply the improved attachment or supplemental lighting devices which always remain at a fixed downward angle of inclination and project their light rays in advance of the front wheels of the automobile or vehicle to enable a driver or chauffeur to steer with certainty and at the same time relieve the front of the automobile of the objectionable forward glare above mentioned. At any time desired the supplemental lighting devices may be opened at the rear to adjust or replace the incandescent electric lights 16 or to manipulate any other form of lighting devices that may be used. The cap 12 is so mounted as to be movable in an upward direction to give access to the lighting device carried thereby, and when this cap 12 is closed it will be held against accidental disengagement by the catch 13 which, as shown, is in part carried by the casing of the supplemental devices 9 and in part by the cap.

The improved lighting attachment will be found exceptionally advantageous, and the cost of manufacture being reduced to a minimum automobiles now in use can be readily equipped with the same or that portion of each group which completes the dual lighting attachment at each side of the machine or vehicle may be applied to the supports or yokes now in use, and it will be understood that the lighting attachment comprises the two lighting devices in each group. In some instances a single group of the lighting devices may be used in connection with a vehicle if one group is found to be sufficient. It will also be understood that changes in the proportions, dimensions and minor details may be resorted to without departing from the spirit of the invention.

What is claimed is:

1. A lighting attachment for automobiles and other vehicles consisting of groups of lighting devices, each group comprising a fixed lighting device for projecting light rays straight away in a horizontal plane and exclusively from the front thereof and a structurally independent lighting device arranged closely beneath the first named lighting device and disposed at a fixed downward angle of inclination and from the front of which the light rays are exclusively projected invariably at a downward angle, the said independent lighting device having less lighting intensity than the first named lighting device, and means associated exclusively with the two lighting devices for rendering the lighting devices independently or conjointly active as illuminating means.

2. A lighting attachment for an automobile or other vehicle consisting of a fixed headlight having a distinct casing with a light opening and glass cover therefor only at the front portion and from which light rays may be projected exclusively from the front in a horizontal plane, and a downwardly inclined fixed supplemental device having a casing independent of the casing of the fixed headlight and a light opening and glass cover only at the front thereof, the casing of the inclined supplemental lighting device being spaced from the lower portion of the casing of the fixed headlight, the downwardly inclined fixed supplemental lighting device casting light rays exclusively at an invariable downward and forward angle of inclination, said supplemental lighting device being of lesser lighting intensity than the headlight above the same, and manually operative electrical means exclusively associated with the headlight and supplemental lighting device for individually and conjointly illuminating the headlight and supplemental lighting device.

3. A lighting attachment for an automobile or other vehicle consisting of groups of lighting devices, each group comprising a fixed headlight for projecting light rays horizontally and exclusively from the front thereof, a lighting device arranged closely beneath the headlight and disposed at a fixed downward angle of inclination and from the front of which light rays are exclusively projected invariably at a downward angle, and manually operative means for rendering the headlight and the said lighting device independently or conjointly active as illuminating means irrespective of the direction of movement of the automobile or other vehicle to which the lighting attachment may be applied.

4. A lighting attachment for automobiles or other vehicles consisting of a group of two lighting devices fixed against lateral and vertical movements, one lighting device being arranged above the other and projecting the light rays straight away in a horizontal plane therefrom and the other lighting device disposed below and at a downward angle of inclination relatively to the first named lighting device and of lesser lighting intensity than the upper lighting device, and means for rendering the two lighting devices active as illuminating means.

In testimony whereof I have hereunto set my hand in presence of two subscribing witnesses.

WILLIAM N. ALLAN.

Witnesses:
 ARMSTEAD N. WEBB,
 JAMES E. STEUART.